July 7, 1925.
J. H. HAMMOND, JR
1,544,746
METHOD AND APPARATUS FOR CONTROLLING WATER CRAFT FROM AIRCRAFT
Original Filed Aug. 10, 1916   7 Sheets-Sheet 1
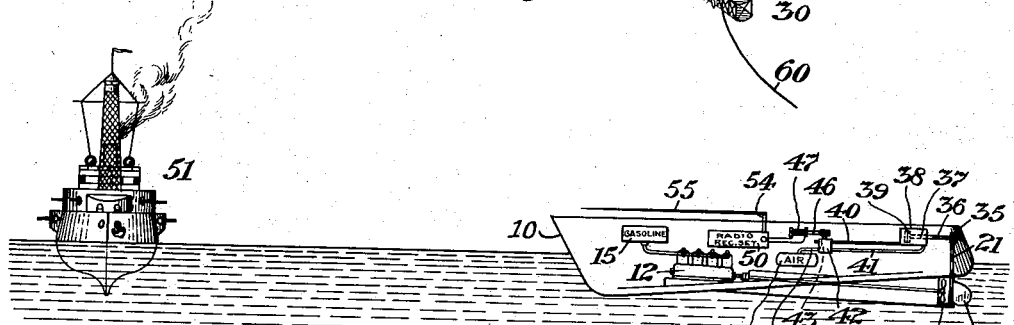
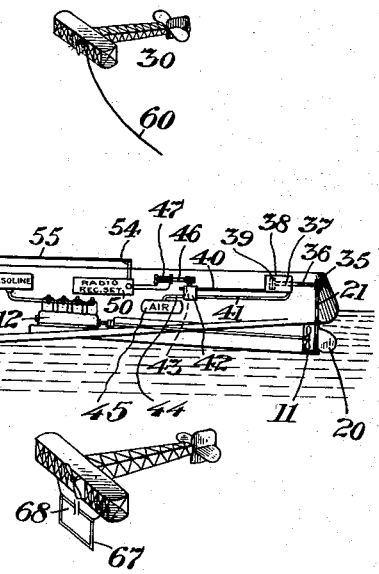
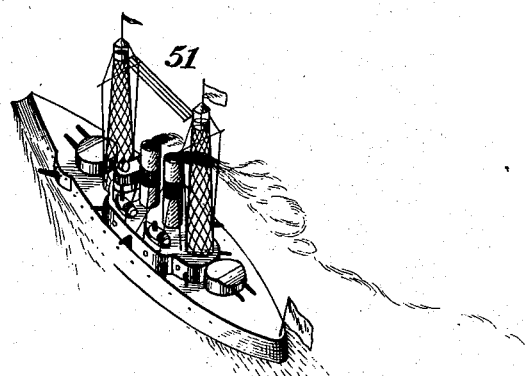
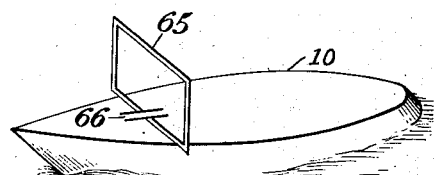
INVENTOR
John Hays Hammond Jr.
By
A. J. Gardner
HIS ATTORNEY July 7, 1925.
J. H. HAMMOND, JR
1,544,746
METHOD AND APPARATUS FOR CONTROLLING WATER CRAFT FROM AIRCRAFT
Original Filed Aug. 10, 1916    7 Sheets-Sheet 2
*Fig.3*
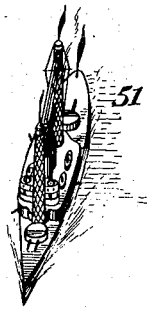
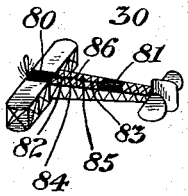
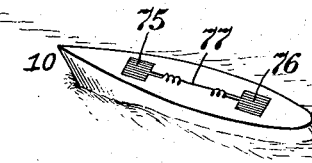
*Fig.4ª*
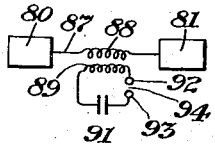
*Fig.4*
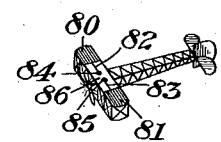
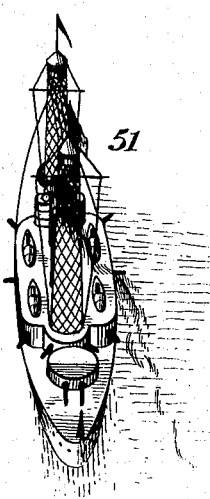
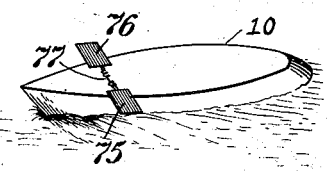
INVENTOR
John Hays Hammond Jr.
BY
A. J. Gardner
HIS ATTORNEY July 7, 1925.

J. H. HAMMOND, JR 1,544,746

METHOD AND APPARATUS FOR CONTROLLING WATER CRAFT FROM AIRCRAFT

Original Filed Aug. 10, 1916   7 Sheets-Sheet 4

WITNESS
Chas. J. Clagett

INVENTOR
John Hays Hammond Jr.
BY
A. J. Gardner
HIS ATTORNEY

July 7, 1925.

J. H. HAMMOND, JR 1,544,746

METHOD AND APPARATUS FOR CONTROLLING WATER CRAFT FROM AIRCRAFT

Original Filed Aug. 10, 1916    7 Sheets-Sheet 5

WITNESS
Chas. F. Clagett

INVENTOR
John Hays Hammond Jr.
BY
A. J. Gardner
HIS ATTORNEY

July 7, 1925.

J. H. HAMMOND, JR 1,544,746

METHOD AND APPARATUS FOR CONTROLLING WATER CRAFT FROM AIRCRAFT

Original Filed Aug. 10, 1916    7 Sheets-Sheet 6

WITNESS
Chas. F. Clagett

INVENTOR
John Hays Hammond Jr.
A. J. Gardner
HIS ATTORNEY

July 7, 1925.  1,544,746
J. H. HAMMOND, JR
METHOD AND APPARATUS FOR CONTROLLING WATER CRAFT FROM AIRCRAFT
Original Filed Aug. 10, 1916    7 Sheets-Sheet 7

WITNESS
Chas. F. Clagett

INVENTOR
John Hays Hammond, Jr.
BY
A. J. Gardner
HIS ATTORNEY

Patented July 7, 1925.

1,544,746

UNITED STATES PATENT OFFICE.

JOHN HAYS HAMMOND, JR., OF GLOUCESTER, MASSACHUSETTS.

METHOD AND APPARATUS FOR CONTROLLING WATER CRAFT FROM AIRCRAFT.

Application filed August 10, 1916, Serial No. 114,170. Renewed August 25, 1923.

*To all whom it may concern:*

Be it known that I, JOHN HAYS HAMMOND, Jr., a citizen of the United States, and a resident of Gloucester, in the county of Essex and State of Massachusetts, have invented certain new and useful Methods and Apparatus for Controlling Water Craft from Aircraft, of which the following is a specification.

One of the objects of this invention is to provide improved methods and means whereby the control of a torpedo boat or other water craft may be effected from a transmitting station on an aeroplane or other air craft in such a manner as to render any interference with such control from any other station, and particularly from any station located upon the shore or upon another water craft, practically impossible.

Further objects of this invention are to provide in a radio dynamic system, improved transmission means, improved receiving means, and other improvements as will appear hereinafter.

Figure 5:
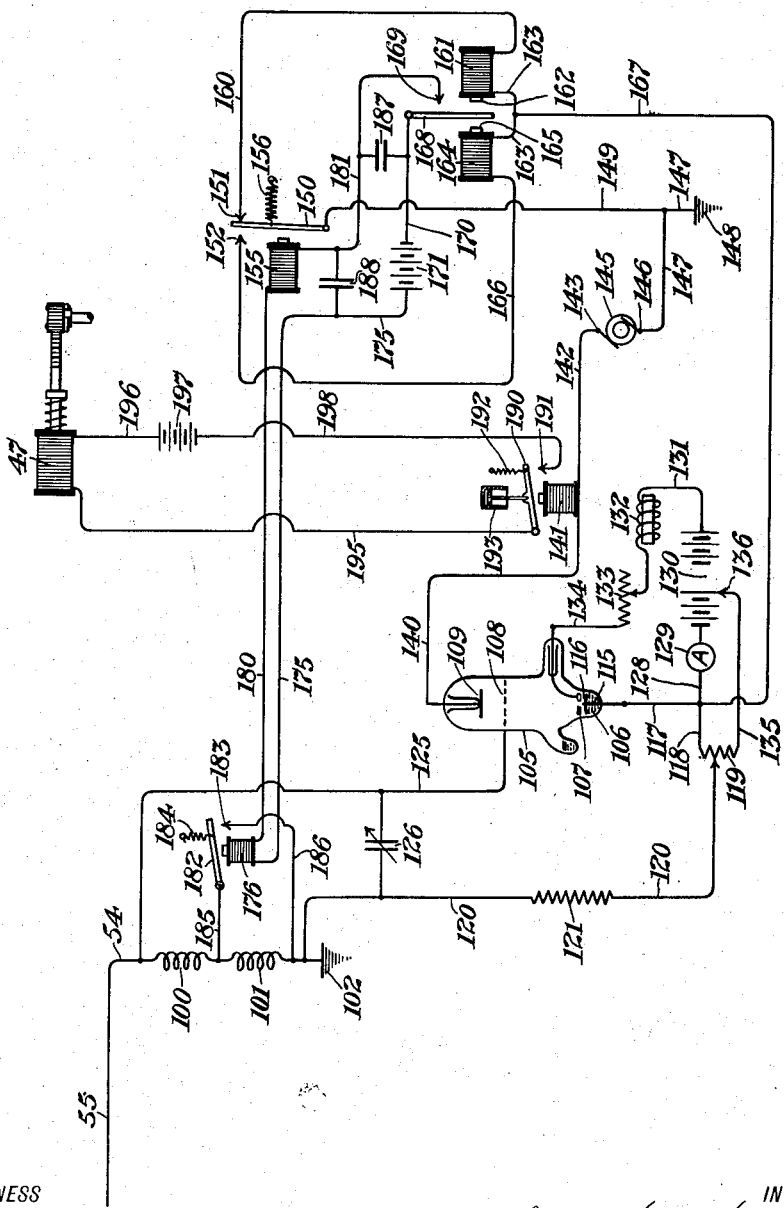

In the accompanying drawings, Fig. 1 is a diagrammatic view of a system of radio dynamic control constructed in accordance with this invention; Figs. 2, 3, and 4 are diagrammatic views showing modified forms of the same; Fig. 4^A is a diagrammatic view showing a spark gap inductively connected in the Hertz oscillator forming a part of this invention; Fig. 5 is a diagrammatic view of a selective receiving system constructed in accordance with this invention; and Figs. 6 to 13 inclusive are fragmentary diagrammatic views showing modifications constructed in accordance with this invention, of the receiving system shown in Fig. 5.

Referring to the accompanying drawings, one embodiment of this invention comprises a torpedo boat 10 or other vessel or dirigible device, which is provided with the usual propeller 11 arranged to drive the same forward and to be actuated by any suitable means, as, for instance, by an internal combustion motor 12 arranged to be supplied with gasoline or other liquid fuel from a tank 15 carried by the boat 10. The boat 10 is also provided with the usual or any suitable rudder 20 which is fixed upon a rudder post 21 arranged to rotate about an axis fixed with respect to the boat 10.

For controlling the rudder 20 to steer the boat on any desired course in response to radiant energy received from an aeroplane or other air craft 30, the boat may be provided with any well known or suitable mechanism arranged to be controlled in response to radiant energy acting through suitable receiving means carried by the boat. In the form of this invention illustrated the upper portion of the rudder post 21 has fixed thereon a gear 35 which engages and is actuated by a substantially horizontal rack 36 extending longitudinally of the boat and rigidly secured to and in alinement with the rear end of a reciprocatory piston rod 37 which extends through one end of a cylinder 38 which is fixedly secured within the boat 10, and which has arranged to reciprocate therein a piston 39, which is rigidly secured to the forward end of the piston rod 37.

The opposite ends of the cylinder 38 are connected respectively by pipes 40 and 41 with a stationary valve casing 42 which contains a rotary valve 43. The valve casing 42 is connected by a pipe 44 with a tank 45 containing compressed air, or is connected to any other source of fluid pressure. The rotary valve 43 is arranged to be rotated step by step in any well known or suitable manner by a reciprocatory rod 46 forming the core of a stationary solenoid 47, the opposite ends of which are connected to any well known or suitable radio receiving apparatus 50 carried by the boat.

The radio receiving apparatus 50 may be connected to and arranged to be energized by any well known or suitable aerial or similar element, but in the form of this invention shown in Fig. 1, to render the receiving apparatus 50 particularly susceptible to the influence of radiant energy transmitted from the aeroplane 30 and practically unresponsive to radiant energy transmitted from any point towards which the boat 10 may be directed, as, for instance, from a vessel 51, in front of the boat 10, the radio receiving apparatus 50 is provided with an antenna comprising a relatively short vertical portion 54 and a relatively long substantially horizontal portion 55 integral with and freely projecting forwardly from the upper end of the vertical portion 54, the horizontal or elongated portion 55 being preferably many times longer than the vertical portion 54. It has been found that an antenna of this form is most responsive to radiant energy received from a point above the antenna and somewhat in the rear of a vertical line coincident with the vertical portion 54 of the antenna, and is practically unresponsive to the influence of radiant energy transmitted from any point in front of the antenna, as, for instance, from the vessel 51 towards which the boat 10 is directed.

For transmitting radiant energy to the antenna 54, 55, shown in Fig. 1, the aeroplane 30 may be provided with any suitable radio transmitting apparatus, and in the form shown in Fig. 1 the aeroplane 30 is provided with transmitting apparatus including an antenna 60 in the form of a flexible wire which depends freely from the aeroplane. It is to be understood that both the transmitting apparatus carried by the aeroplane 30 and the receiving apparatus carried by the boat 10 may be tuned in any desired manner, and may be of any well known or suitable selective construction so as to provide all the protection possible against any interference in the control of the boat.

In the modified form of this invention shown in Fig. 2 the construction of the boat 10 and the apparatus carried thereby is as hereinbefore described except that instead of having the boat provided with an antenna 54, 55 of the form shown in Fig. 1, the boat is provided with an antenna 65 in the form of a rectangular loop arranged in a vertical plane extending transversely of the boat, the loop 65 being provided with a condenser 66 and being connected in any well known or suitable manner to the hereinbefore described radio receiving apparatus 50 carried by the boat. When a receiving loop 65 is carried by the boat 10 the aeroplane 30 is preferably provided with a corresponding loop 67 depending therefrom in an approximately vertical plane extending transversely of the aeroplane, the transmitting loop 67 containing a condenser 68 and being connected in any well known or suitable manner to any suitable radio transmission apparatus (not shown) carried by the aeroplane. It has been found that with this arrangement of receiving and transmitting loops 65 and 67 the boat 10 may be readily controlled from the aeroplane and will be practically unresponsive to radiant energy transmitted from any point towards which the boat may be proceeding, as, for instance, from the vessel 51.

In the modified form of this invention shown in Fig. 3, the construction of the boat 10 and the apparatus carried thereby is the same as hereinbefore described in connection with Fig. 1 except that instead of the antenna 54, 55 shown in Fig. 1, the boat is provided with a Hertz receiving oscillator, suitably connected to the radio receiving apparatus 50 and comprising two comparatively large rectangular metal plates 75 and 76 spaced longitudinally of the boat and secured to the upper surface or deck of the boat, the plates 75 and 76 being connected by any suitable conductor 77 extending longitudinally of the boat. In this form of the invention the aeroplane 30 is provided with suitable radio transmission apparatus (not shown) and which is connected in any well known or suitable manner to a Hertz oscillator including two comparatively large rectangular comparatively thin metal plates 80 and 81 spaced longitudinally of the aeroplane and arranged so as to lie normally in an approximately horizontal plane. These plates 80 and 81 may form portions of one or more wings of the aeroplane or may be secured to one or more wings of the aeroplane. For instance, the plates 80 and 81 might each be formed of a sheet of tin foil spread upon and secured to one of the wings of the aeroplane or any other suitable base or surface carried by the aeroplane. The plates 80 and 81 may be arranged so as to have either their upper surfaces or their lower surfaces, or both surfaces, exposed. In the form of this invention shown in Figs. 3 and 4, two alined conductors 82 and 83 lead inwardly from the two plates 80 and 81 respectively, and terminate respectively in two knobs 84 and 85 which are spaced slightly apart to form a spark gap 86; but instead of this arrangement the plates 80 and 81 may be connected (as shown in Fig. 4^A) by a conductor 87 including a coil 88 which is inductively coupled to a circuit including a coil 89, a condenser 91 and two spaced knobs 92 and 93 forming a spark gap 94.

In the form of this invention shown in Fig. 4 the construction of the boat 10 and the aeroplane 30 is as just described in connection with Fig. 3 except that the plates 75 and 76 of the receiving oscillator and the plates 80 and 81 of the transmission oscillator are arranged transversely of the boat 10 and of the aeroplane 30 instead of longitudinally.

In both of the forms of the invention shown in Figs. 3 and 4 the radio receiving apparatus of the boat 10 would be responsive to the radio transmission apparatus carried by the aeroplane 30 but would be practically unresponsive to radiant energy transmitted from any point substantially in a horizontal plane with the boat, except that the form of receiving apparatus shown in Fig. 4 might be influenced by a parallel oscillator in a horizontal plane approximately coincident with the plane of the Hertz receiving oscillator 75, 76, but would not be appreciably affected by the vertical transmitting oscillator of another vessel or upon the shore.

As a further means of preventing any interference with the control of the boat, this invention provides in each of the several forms of this invention illustrated, a selective system for the transmission and reception of radiant energy whereby the successive or combined influence or co-operation of different wave or impulse characteristics is required in order to effect the operation of the device or devices which function in the control of the boat.

One of the forms of selective receiving means which is thus utilized upon the boat is shown in Fig. 5, and comprises an L shaped antenna 54, 55, which is arranged longitudinally of the boat with the free end of the antenna pointing towards the bow of the boat, as shown in Fig. 1. The vertical portion 54 of the antenna leads downwardly through two inductances 100 and 101 to a suitable "ground" 102. The two inductances 100 and 101 are so proportioned that when both are in series with the antenna, the antenna will be tuned to respond to radiant energy having a given frequency, such for instance, as a given wave frequency, but when the lower inductance 101 is cut out or short circuited as by means hereinafter described, then the antenna will respond only to radiant energy having a second given frequency.

For detecting electroradiant oscillations received by the antenna 54, 55, any suitable detector may be provided, the one shown for this purpose being a mercury vapor detector comprising an evacuated glass bulb 105 containing a mercury cathode 106, a flat nickel anode 107, a flat circular perforated metal grid 108 and a metal top terminal 109. A conductor or lower electrode 115 extends upwardly through the mercury cathode and is provided at its upper end with a platinum tip 116 which projects slightly above the upper surface of the mercury to render the cathode spot of the arc discharge stationary. The outer portion of the conductor 115 is connected through a conductor 117, conductor 118, potentiometer 119 and conductor 120 with the vertical portion 54 of the antenna at a point below the lower inductance 101. The conductor 120 preferably has in series therewith a high resistance 121 for reducing the persistence of the operation of the detector after the impulse which initiated such operation has ceased.

The grid 108 is connected by a conductor 125 with the vertical portion 54 of the antenna at a point above the upper inductance 100. The conductors 120 and 125 are connected through a variable condenser 126 forming therewith a closed oscillatory circuit.

The lower electrode 115 is also connected through the conductor 117, a conductor 128 and ammeter 129 to one pole of a battery 130, the opposite pole of which is connected through a conductor 131, inductance 132, variable resistance 133 and conductor 134 to the annular anode 107. A conductor 135 leads from the potentiometer and terminates in a contact 136 which is adjustable and may be connected to the battery 130 at any suitable point.

The top terminal 109 of the detector is connected by a conductor 140 through a relay 141 and conductor 142 to one brush or terminal 143 of an alternator 145, the other brush or terminal 146 of which is connected through a conductor 147 with a suitable "ground" 148 to prevent surges or local interference reaching the detector, and is also connected through a conductor 149 with a soft iron armature 150 which is pivoted to oscillate about a fixed axis and to engage alternately two fixed contacts 151 and 152, and to be controlled by a stationary electromagnet 155 forming therewith a reversing relay, the armature 150 being normally held in engagement with the contact 151 by means of a spiral spring 156. The former contact 151 is connected by a conductor 160 with one end of the winding of a stationary electromagnet 161 which surrounds a core 162 which is a permanent magnet. The other end of the winding of the electromagnet 161 is connected by a conductor 163 with one end of the winding of a stationary electromagnet 164, which is provided with a soft iron core 165 and the other end of which is connected by a conductor 166 with the other fixed contact 152. The two stationary magnets 161 and 164 are arranged in spaced alined relationship and the conductor 163 by which they are connected is connected by a conductor 167 and the conductor 117, with the lower terminal 115 of the detector. Pivoted to oscillate about a fixed axis and having its free end normally depending freely between the two electromagnets 161 and 164, is a soft iron armature 168 which is arranged to swing into and out of engagement with a fixed contact or terminal 169, and to be moved into engagement with the contact 169 as a result of the energization of the electromagnet 161, and to then be held in engagement with the contact 169 by the permanent magnet 162 after the circuit through the electromagnet 161 has been broken and until the other electromagnet 164 has been energized, as will appear hereinafter. The two magnets 161 and 164 in combination with the armature 168 and contact 169 form a polarized relay. The armature 168 is connected by a conductor 170 with one pole of a battery 171, the other pole of which is connected by a conductor 175 with one end of the winding of an electromagnet 176, the other end of which is connected by a conductor 180 with one end of the winding of the electromagnet 155 of the reversing relay and the other end of the latter winding is connected by a conductor 181 with the fixed contact 169 of the polarized relay.

The electromagnet 176 is arranged to control a soft iron armature 182 which is pivoted to oscillate about a fixed axis into and out of engagement with a fixed contact 183, being normally held out of engagement with the contact 183 by means of a spiral spring 184. The armature 182 is connected by a conductor 185 of low resistance to the antenna at a point between the two inductances 100 and 101, and the contact 183 is connected by a conductor 186 of low resistance with the antenna at a point below the lower inductance 101.

To prevent arcing at the contacts and surgings back into the detector of currents set up by the rapid movement of the hereinbefore described armatures of the relays, the two conductors 170 and 181 are connected through a condenser 187, and the two conductors 175 and 181 are connected through a condenser 188.

For controlling the steering mechanism of the torpedo, the hereinbefore described electromagnet 141 is arranged to control a soft iron armature 190 which is pivoted to swing about a fixed axis into and out of engagement with a fixed contact 191, and is normally held out of engagement with the contact 191 by a spiral spring 192. A dash pot 193 or other retarding means is connected to the armature 190 to retard its movement towards the contact 191, thus providing a "slow relay." The armature 190 is connected by a conductor 195 with one end of the winding of the hereinbefore described electromagnet 47, the other end of which is connected by a conductor 196 with one pole of a battery 197 the opposite pole of which is connected by a conductor 198 with the fixed contact 191.

In the operation of the form of this invention shown in Fig. 5 and just described, the armature 182 is normally out of engagement with the contact 183, and consequently, both inductances 101 and 102 are in series with the antenna 55, 54, which will then respond only to radiant energy having a given frequency. Also normally, very little if any current flows through the detector 105 from the source 145 of alternating current, and the armature 190 for controlling the steering of the torpedo remains inoperative. Also the armature 150 is normally in engagement with the contact 151 and the armature 190 is out of engagement with the contact 191. The armature 168 is also normally out of engagement with the contact 169 and depending freely between the two electromagnets 161 and 164.

When now, the detector having been properly adjusted, the antenna receives radiant energy of the required given frequency, the potential of the grid 108 will be increased and the apparent resistance of the interior of the detector will be decreased thus permitting a unidirectional pulsating current to flow from the source of alternating current 145 through the brush 143 through the main controlled circuit comprising the conductor 142, electromagnet 141, conductor 140, terminal 109, bulb 105, terminal 115, conductors 117, 167, 163, electromagnet 161, conductor 160, contact 151, armature 150 and conductor 149 to the other brush 146, thus energizing the electromagnet 161. The armature 168 is thus caused to swing into engagement with the contact 169, thus closing the normally open wave changing circuit comprising the contact 169, conductor 181, electromagnet 155 of the reversing relay, conductor 180, electromagnet 176, conductor 175, battery 171, conductor 170 and armature 168, and thus simultaneously energizing the electromagnet 155 and the electromagnet 176 and causing the corresponding armature 150 to swing out of engagement with the contact 151 and into engagement with the contact 152, and the armature 182 into engagement with the contact 183. The main controlled circuit is thus broken and consequently the electromagnet 141 is deenergized before it has had time to become effective in closing the circuit through the battery 197 for controlling the steering of the torpedo. Also as a result of the breaking of the main controlled circuit, the electromagnet 161 is immediately deenergized, but the armature 168 is still held in engagement with the contact 169 by the influence of the permanent magnet 162 forming the core of the electromagnet 161. At the same time the closing of the circuit through the conductor 185, armature 182, contact 183 and conductor 186 cuts out the lower inductance 101 and renders the antenna unresponsive to radiant energy of the frequency first effective and responsive only to radiant energy having a predetermined greater frequency. If now radiant energy having the required predetermined greater frequency should be received by the antenna 55, 54, the antenna would respond and the potential of the grid 108 would consequently again be raised thus causing a unidirectional current to flow from the source 145 through the brush 143, conductor 142, electromagnet 141, conductor 140, bulb 105, conductors 117, 167 and 163, electromagnet 164, conductor 166, contact 152, armature 150 and conductors 149 and 147 to the other brush 146 of the source 145, thus drawing the armature 168 away from the contact 169 and breaking the secondary controlled circuit through the battery 171 and electromagnets 176 and 155, and thus restoring the system to its initial condition and at the same time momentarily energizing the electromagnet 141 which controls the steering mechanism of the torpedo.

In the practical operation of the system shown in Fig. 5, two series of waves of radiant energy having the two required frequencies respectively are transmitted simultaneously from the sending station, or a single series of waves having the two periodicities simultaneously imposed or impressed thereon in any well known or suitable manner, is transmitted from the sending station, thus causing a rapid alternation in the operation of the receiving system, as hereinbefore described, and causing the electromagnet 141 which controls the steering of the torpedo to be repeatedly energized momentarily and with sufficient rapidity to cause its armature 190 to be drawn into engagement with its contact 191, thus closing the circuit through the battery 197 and electromagnet 47, and causing the operation of the steering mechanism of the torpedo, as hereinbefore described.

Figure 6:
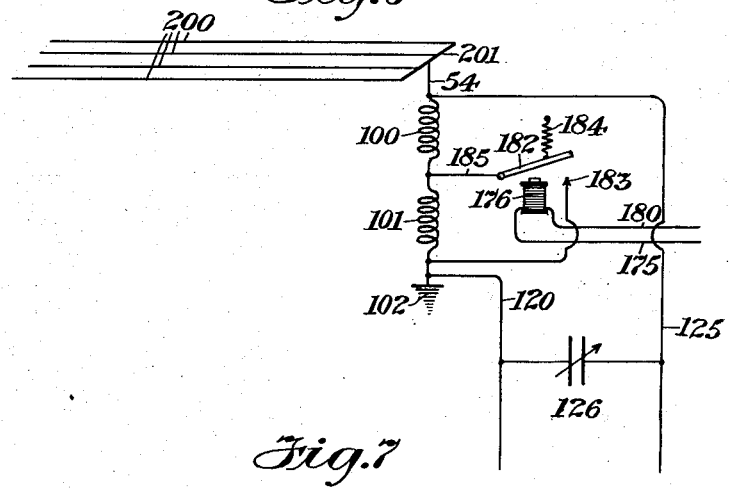

In Fig. 6 is shown a perspective view of a modified form of directional antenna which might be substituted in the system shown in Fig. 5 for the antenna 55, 54, 100, without otherwise changing the system. In this modified form the antenna comprises a plurality of relatively long substantially parallel conductors 200 normally extending substantially horizontally and preferably arranged in a substantially horizontal plane. These conductors project freely from and are carried by a transverse conductor 201 which is connected to and carried by the upper end of the relatively short vertical portion 54 of the antenna which includes the two inductances 100 and 101 and the lower end of which is suitably grounded as at 102.

Figure 7:
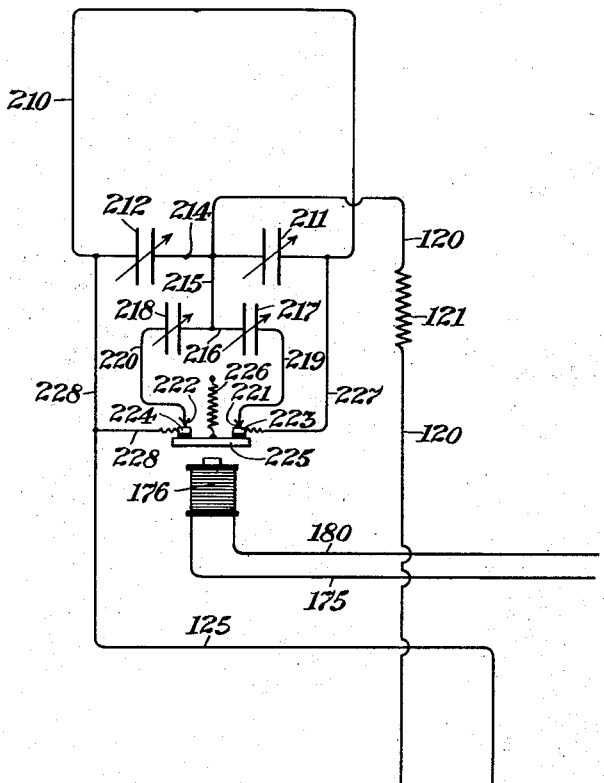

In Fig. 7 is shown one application of the hereinbefore described selective receiving system to the looped antenna, arranged upon a torpedo boat as shown in Fig. 2. This form of the invention comprises a rectangular looped antenna 210, which may be arranged transversely of a torpedo boat as shown in Fig. 2 at 65. This looped antenna 210 has in series therewith two variable condensers or capacities 211 and 212, which are arranged in the lower horizontal portion of the antenna 210. The conductor 214, connecting the two condensers 211 and 212 is connected by a conductor 215 with a conductor 216, which connects the inner portions of two secondary variable condensers or capacities 217 and 218, the outer portions of which are connected by two conductors 219 and 220 with two stationary spaced contacts 221 and 222. Arranged to cooperate with the two stationary contacts 221 and 222 are two movable contacts 223 and 224, which are carried by and insulated from an armature 225 which is arranged to reciprocate in a fixed path and which is normally pressed toward the fixed contacts 221 and 222 by a spiral spring 226 which normally holds the movable contacts 223 and 224 in engagement with the fixed contacts 221 and 222. The movable contacts 223 and 224 are connected by conductors 227 and 228 to the antenna 210 at points in the lower horizontal portion of the antenna outside of the two condensers 211 and 212 respectively.

In this modified form of the invention the looped antenna 210 and the cooperating condensers and connections 211 to 225 just described are substituted for the antenna 55, 54, 100, 101 and the conductor 185 and its spring 184, and the contact 183 and its conductor 186, shown in Fig. 5; and the electromagnet 176 shown in Fig. 5 is arranged as shown in Fig. 7 to cooperate with the armature 225. The conductor 214 between the two condensers 211 and 212 is connected to the conductor 120 shown in Fig. 5, while the conductor 228 of Fig. 7 is connected to the conductor 125 shown in Fig. 5 which leads to the grid 108 of the detector. The system partially shown in Fig. 7 is exactly the same in construction and operation as the system shown in Fig. 5 except for the substitutions just described.

In the operation of this form of the invention, when the parts are in their normal positions as shown and the looped antenna 210 receives an impulse of radiant energy of the required frequency, the detector 105 will be operated and thus energize the magnet 176, which will cause its armature 225 to be attracted and thus separate the movable contacts 223 and 224 from the fixed contacts 221 and 222, thus cutting out the condensers 217 and 218 from the receiving circuit and thus decreasing the capacity of the receiving circuit and rendering it responsive only to radiant energy having a corresponding frequency, which when received will cause a second operation of the detector 105 and the deenergization of the magnet 176, whereupon the armature 225 will be restored to its initial position, and this cycle of operations will be repeated as long as the receiving circuits receive waves having the two required frequencies as hereinbefore described.

Figure 8:
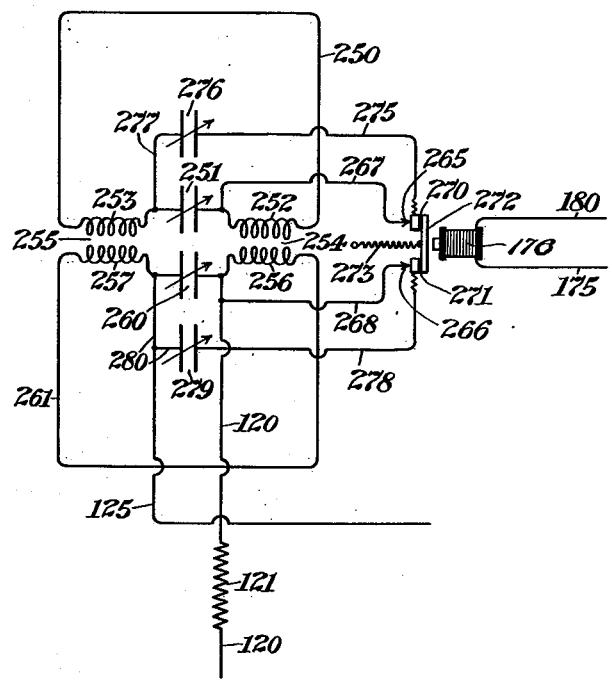

In Fig. 8 is shown another application of the hereinbefore described selective receiving system to the looped antenna, arranged upon a torpedo boat as shown in Fig. 2. This form of the invention comprises a receiving antenna in the form of a rectangular loop 250 which is arranged transversely of the torpedo boat as shown in Fig. 2 at 65. The lower horizontal portion of this looped antenna 250 has arranged centrally therein a variable condenser or capacity 251, and upon the opposite sides of this condenser and in series therewith are two inductances 252 and 253 which form the primaries of two transformers 254 and 255, the secondary coils 256 and 257 of which have their inner ends connected to the opposite sides of a secondary variable condenser 260, and have their outer ends connected by a conductor 261.

For simultaneously changing the capacity of the looped antenna circuit 250 and the closed oscillatory circuit 256, 260, 257 and 261, two fixed contacts 265 and 266 are connected by conductors 267 and 268 respectively to the inner ends of the two coils 252 and 256 and are arranged to cooperate with two movable contacts 270 and 271 which are carried by and insulated from an armature 272 which is arranged to reciprocate in a fixed path and which is normally drawn by a spring 273 towards the fixed contacts 265 and 266 to hold the movable contacts 270 and 271 in engagement with the fixed contacts 265 and 266. The movable contact 270 is connected by a conductor 275 to one side of a variable condenser 276, the other side of which is connected by a conductor 277 with the inner end of the coil 253. The other movable conductor 271 is connected by a conductor 278 with one side of a variable condenser 279, the other side of which is connected by a conductor 280 with the inner end of the secondary coil 257. The armature 272 shown in Fig. 8 is substituted for the armature 182 shown in Fig. 5 and is arranged to be controlled by the electromagnet 176 shown in Fig. 5. The system partially shown in Fig. 8 is exactly the same in construction and operation as the system shown in Fig. 5 except that the parts shown in Fig. 8 are substituted for the L-shaped antenna 55, 54, 100, 101 and the armature 185 and fixed contact 183 and condenser 126.

In this modified form shown in Fig. 8, when the parts are in their normal positions as shown, and an impulse or signal of radiant energy having the proper wave frequency or other characteristic frequency is received by the looped antenna 250 the detector 105 will be caused to operate as hereinbefore described, which will energize the electromagnet 176 and draw the armature 272 and the contacts 270 and 271, carried thereby, away from the fixed contacts 265 and 266 and thus change the capacity of the looped antenna 250 by simultaneously cutting out the condensers 276 and 279 from the antenna circuit 250 and the closed circuit 261 respectively, and leaving therein respectively the condensers 251 and 260, thus causing a change in the tuning of the antenna circuit 250 and a corresponding change in the tuning of the closed oscillatory circuit 261. When both of these circuits 250, 261 are energized in response to an impulse or signal of radiant energy of the proper frequency, the detector 105 will be again operated and the electromagnet 176 de-energized to change the responsiveness of the circuits 250 and 261, and this operation will be repeated as hereinbefore described as long as waves of both frequencies are being received by the looped antenna 250, and the electromagnet 47 for controlling the steering may thus be operated only when waves of both frequencies are received as hereinbefore described.

Figure 9:
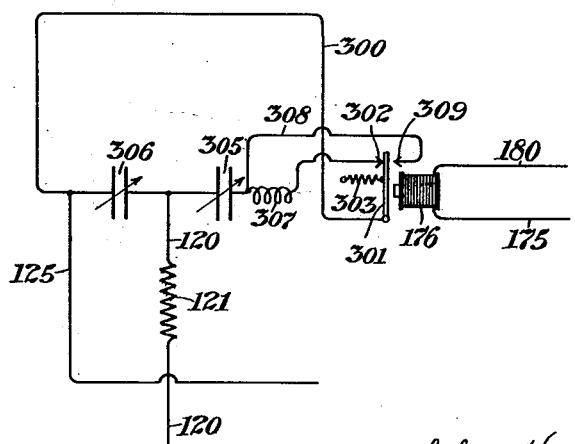

In Fig. 9 is shown another application of the hereinbefore described selective receiving system to the looped antenna arranged upon a torpedo boat as shown in Fig. 2. This form of the invention comprises a receiving antenna 300 in the form of a rectangular loop, which may be arranged transversely of a torpedo boat as shown in Fig. 2 at 65. This antenna has in series therewith a switch in the form of an armature 301 pivoted to swing about a fixed axis and arranged to swing into and out of engagement with a fixed contact 302 which forms a terminal of the antenna, the armature 301 being normally held in engagement with the fixed contact 302 by a spiral spring 303. The antenna also has in series therewith two variable condensers 305 and 306 and an inductance 307. A conductor 308 leads from the inner end of the inductance 307 to a stationary contact 309 which is arranged to be engaged by the armature 301 when the armature is moved away from the other fixed contact 302. The looped antenna 300 is substituted for the L-shaped antenna 55, 54, 100, 101, shown in Fig. 5, and is connected to the detector 105 by the conductors 120 and 125 as hereinbefore described. The armature 301 takes the place of the hereinbefore described armature 182 and is arranged to be controlled by the electromagnet 176 as hereinbefore described. In this form of the invention, when radiant energy having a suitable frequency is received by the antenna 300 the detector is caused to operate, thus energizing the electromagnet 176 and thus causing the armature 301 to be moved away from the fixed contact 302 and into engagement with the fixed contact 309, thereby cutting out the inductance 307 from the antenna circuit and thereby changing its responsiveness and rendering it unresponsive to the first frequency and responsive only to radiant energy having a definite higher frequency. If the antenna 300 now receives this higher frequency the detector will be again operated and will de-energize the magnet 176, thus restoring the antenna circuit to its initial condition. Therefore, only by transmitting radiant energy in which both of the required frequencies occur is it possible to control the electromagnet 47 which controls the steering of the torpedo boat.

Figure 10:
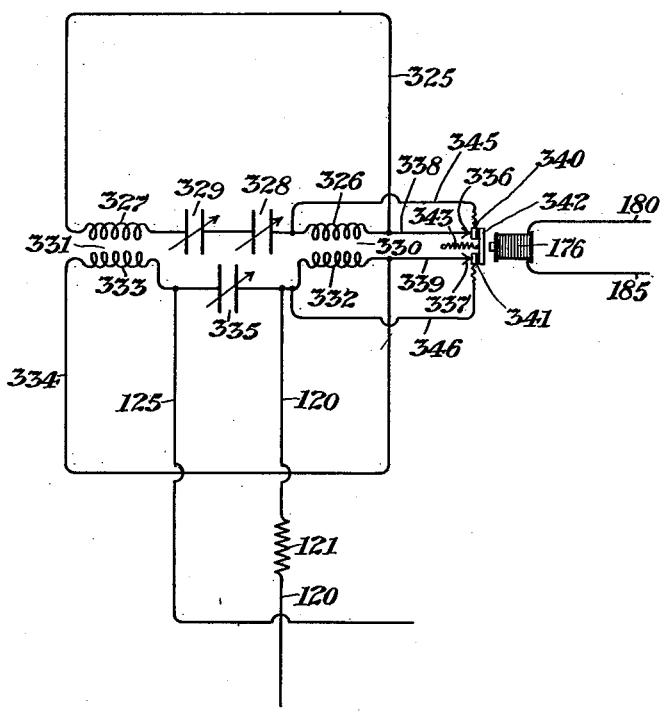

In Fig. 10 is shown still another application of the hereinbefore described selective receiving system to a looped antenna which may be arranged upon a torpedo boat as shown in Fig. 2 at 65. This form of the invention comprises an antenna in the form of a rectangular loop 325 which may be arranged transversely of the torpedo boat as shown in Fig. 2, and which has in series therewith two inductances 326 and 327 and two variable condensers 328 and 329. The inductances 326 and 327 form the primaries of two transformers 330 and 331, the secondary coils 332 and 333 of which form parts of a closed oscillatory circuit 334 which has in series therewith a variable condenser 335 arranged between the coils 332 and 333. Two fixed contacts 336 and 337 are connected by the conductors 338 and 339 to the antenna 325 and the closed circuit 334 respectively and are arranged to be engaged by two movable contacts 340 and 341 which are carried by and insulated from an armature 342 which is arranged to reciprocate in a fixed path and which is normally drawn towards the fixed contacts 336 and 337 by a spiral spring 343 whereby the movable contacts 340 and 341 are normally held in engagement with the fixed contacts 336 and 337. The movable contacts 340 and 341 are connected by conductors 345 and 346 with the antenna 325 and the closed circuit 334 respectively, and the armature 342 is arranged to be controlled by the electromagnet 176 as shown in Fig. 5. The closed circuit 334 is connected by conductors 120 and 125 to the detector 105 as shown in Fig. 5. In the operation of the form of the invention shown in Fig. 10, when radiant energy of suitable frequency is received by the antenna 325 the audion 105 is operated, thus energizing the electromagnet 176 and causing the separation of the movable contacts 340 and 341 from the fixed contacts 336 and 337, thus adding the inductances 326 and 332 to the antenna 325 and the closed circuit 334 respectively and rendering these circuits responsive only to a second frequency which when received again operates the detector and de-energizes the electromagnet 176 and restores the receiving circuits to their initial conditions as hereinbefore described.

Figure 11:
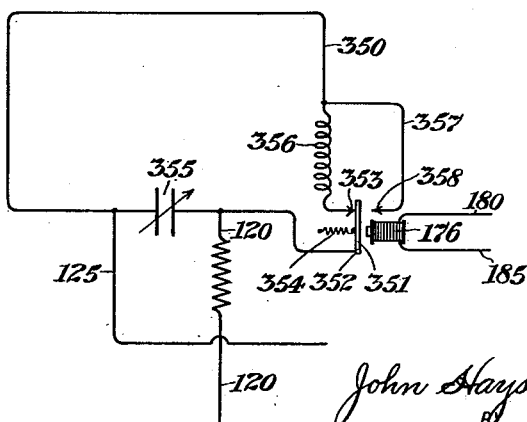

In Fig. 11 is shown another application of the hereinbefore described selective receiving system to a looped antenna, which may be arranged upon a torpedo boat as shown in Fig. 2. This form of the invention comprises an antenna in the form of a rectangular loop 350 which has in series therewith a switch in the form of an armature 351 pivoted as at 352 to swing about a fixed axis into and out of engagement with a fixed contact 353 which forms one terminal of the antenna 350, the armature 351 being normally held in engagement with the contact 353 by a spring 354. The antenna 350 also has in series therewith a variable condenser 355 and an inductance 356 and is provided with a conductor 357 which leads from the antenna to a fixed contact 358 which is arranged to be engaged by the armature 351 when it is moved away from the other fixed contact 353. The antenna 350 is connected by the conductors 120 and 125 with the detector 105, and the armature 351 is arranged to be controlled by the electromagnet 176 as shown in Fig. 5. In this form of the invention, when the antenna 350 receives radiant energy having the required frequency the detector 135 will be operated and will energize the magnet 176 which will cause the armature 351 to swing into engagement with the fixed contact 358 and thus cut out the inductance 356 from the antenna circuit and render the antenna circuit responsive only to radiant energy having a different frequency which when received will restore the antenna circuit to its initial condition. Therefore, radiant energy having two predetermined frequencies is necessary in order to operate this system.

Figure 12:
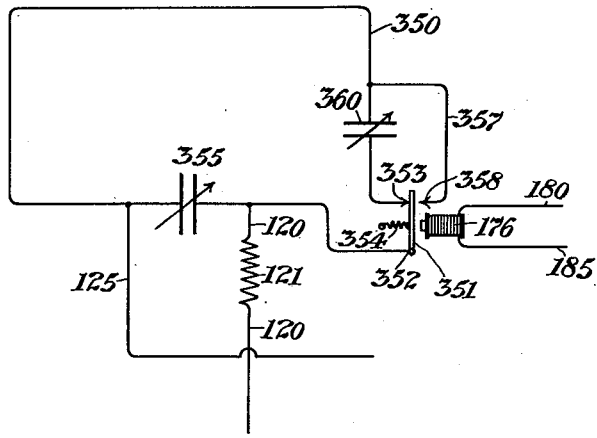

In Fig. 12 the system is exactly the same as that shown in Fig. 11 except that instead of the inductance 356 shown in Fig. 11 a variable condenser 360 is substituted. The operation of this system is substantially the same as that shown in Fig. 11.

Figure 13:
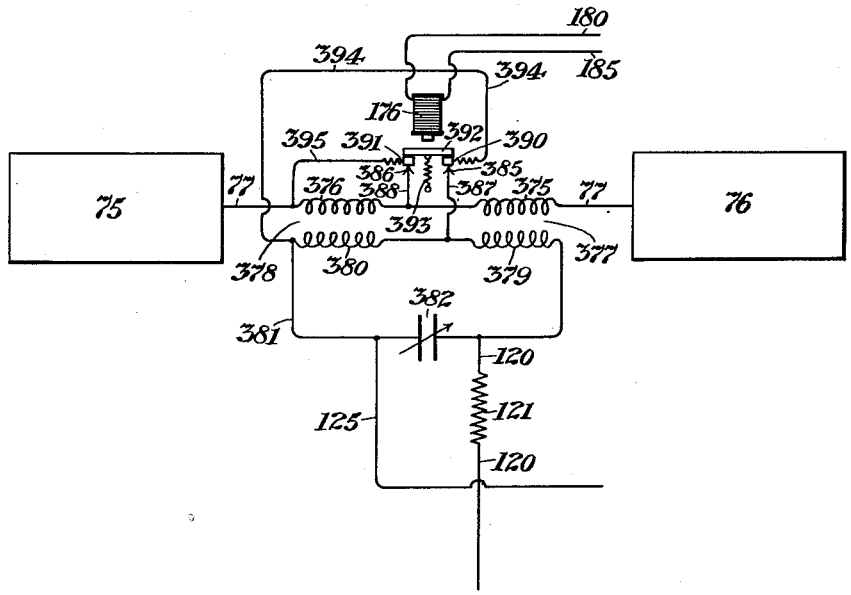

In Fig. 13 is shown an application of the hereinbefore described selective receiving system to a Hertz receiving oscillator, which may be arranged upon a torpedo boat as shown in either Fig. 3 or Fig. 4 at 75, 76, 77. This form of the invention includes two rectangular flat metal plates 75, 76, which are connected by a conductor 77 having in series therewith two inductances 375 and 376 which form the primaries of two transformers 377 and 378, the secondary coils 379 and 380 of which are in a closed oscillatory circuit 381 which has in series therewith a variable condenser 382. The closed circuit 381 is connected by the conductors 120 and 125 to the detector 105, as shown in Fig. 5. Two spaced fixed contacts 385 and 386 are connected by conductors 387 and 388 to the conductor 77 connecting the plates 75 and 76 and to the closed circuit 381 respectively. These fixed contacts 385 and 386 are arranged to be engaged by two movable contacts 390 and 391 which are carried by and insulated from an armature 392 which is arranged to reciprocate in a fixed path and which is normally drawn towards the fixed contacts 385 and 386 by a spring 393 which holds the movable contacts 390 and 391 normally in engagement with the fixed contacts 385 and 386. The movable contacts 390 and 391 are connected by conductors 394 and 395 with the closed circuit 381 and the conductor 77 respectively. The armature 392 is arranged to be controlled by the electromagnet 176 as shown in Fig. 5. In this form of the invention, when the plates 75 and 76 receive radiant energy having the required frequency, the audion 105 will be operated and will cause the magnet 176 to be energized, thus causing the movable contacts 390 and 391 to be moved away from the fixed contacts 385 and 386 and to simultaneously add the inductance 376 and the inductance 380 to the receiving circuit 75, 76, 77 and to the closed circuit 381 respectively, and rendering these circuits unresponsive to the first frequency and responsive only to a second predetermined frequency of radiant energy, which when received will again cause the audion 105 to operate, which will de-energize the magnet 176 and restore the circuits to their initial conditions. Radiant energy having two predetermined frequencies will therefore be required in order to operate this system.

Either two separate transmitters of any well know or suitable construction might be used, or a single transmitter may be arranged to send waves having the two required predetermined frequencies impressed thereon in any well know or suitable manner. The transmission apparatus may be arranged upon the aeroplane in any well known or suitable manner to cooperate with the transmission antenna 60 or with the transmission loop 67 or with the Hertz transmission oscillator 80, 81 arranged as shown and hereinbefore described.

It is also to be understood that while only a very simple pneumatic mechanism is shown for controlling the steering of the boat, any other well known or suitable form of mechanism might be used for this purpose.

In the practical operation of any of the hereinbefore described systems, two series of waves having suitable different frequencies respectively are transmitted simultaneously, or a single series of waves having the two different frequencies simultaneously impressed thereon is transmitted from the sending station on the air craft which may be any well known or suitable construction for this purpose; but it is to be understood that instead of transmitting the two series of waves or the two frequencies on a single series of waves simultaneously, the two series of waves having the required different frequencies respectively, or the two frequencies impressed upon a single series of waves, might be transmitted in quick succession and the result upon the receiving system would be substantially the same, in any case, as hereinbefore described.

To insure secrecy of operation and as an additional safeguard against outside interference in the control of the water craft, the receiving system is preferably tuned to respond successively only to two frequencies of radiant energy which are above the limits of audibility and the transmitting system upon the aircraft is arranged accordingly.

While only a few of the various forms in which this invention may be embodied have been shown herein, it is understood that the invention is not limited to any specific construction but might be embodied in various systems without departing from the spirit of the invention or the scope of the appended claims.

Having thus fully described this invention, I claim and desire to protect by Letters Patent of the United States:

1. The combination with a body, of steering means carried thereby and receiving means carried by said body and responsive to radiant energy for controlling said steering means, said receiving means being arranged to respond more readily to radiant energy transmitted from a station above said body than to radiant energy transmitted from a station substantially in horizontal alinement with said body, and a second dirigible body provided with radio transmission means arranged to energize said receiving means and to coact with greater efficiency upon said receiving means when said second mentioned body is at an elevation above said first mentioned body than when said second mentioned body is substantially in a horizontal plane with said first mentioned body.

2. The combination with a water craft provided with steering means, of receiving means carried by said craft and responsive to radiant energy for controlling said steering means, said receiving means including an oscillatory loop arranged in a plane extending upwardly and transversely of said craft, and an air craft provided with radio transmission means arranged to actuate said receiving means when said air craft is at an elevation above said water craft.

3. The combination with a water craft provided with steering means, of receiving means carried by said craft and responsive to radiant energy for controlling said steering means, said receiving means including an oscillatory loop arranged in a plane extending upwardly and transversely of said craft, and an air craft provided with radio transmission means, including an oscillatory loop depending therefrom and extending transversely thereof, arranged to actuate said receiving means when said air craft is at an elevation above said water craft.

4. The combination with a water craft provided with steering means, of receiving means carried by said craft and responsive to radiant energy for controlling said steering means, said receiving means including an oscillatory loop arranged in a plane extending upwardly and transversely of said craft, and an air craft provided with radio transmission means arranged to actuate said receiving means when said air craft is at an elevation above said water craft, said receiving means being operative to control said steering means only as a result of the successive and combined action of radiant energy having two predetermined frequencies.

Signed at Gloucester in the county of Essex and State of Massachusetts this 24th day of July A. D. 1916.

JOHN HAYS HAMMOND, Jr.

Witnesses:
LESLIE BUSWELL,
WILLIAM E. KERR.